(12) United States Patent
Jones

(10) Patent No.: US 7,145,452 B2
(45) Date of Patent: Dec. 5, 2006

(54) DETECTION OF BODIES

(75) Inventor: David Paul Jones, Milton Keynes (GB)

(73) Assignee: Intelligent Sensors PLC, Towcester (GB)

( * ) Notice: Subject to any disclaimer, the term of this patent is extended or adjusted under 35 U.S.C. 154(b) by 141 days.

(21) Appl. No.: 10/502,891

(22) PCT Filed: Jan. 16, 2003

(86) PCT No.: PCT/GB03/00152
§ 371 (c)(1),
(2), (4) Date: Jul. 21, 2004

(87) PCT Pub. No.: WO03/065324

PCT Pub. Date: Aug. 7, 2003

(65) Prior Publication Data

US 2005/0122223 A1    Jun. 9, 2005

(30) Foreign Application Priority Data

Jan. 30, 2002    (GB) ................................. 0202080.8

(51) Int. Cl.
*G08B 26/00*    (2006.01)

(52) U.S. Cl. ................... 340/518; 340/573.1; 340/552; 340/541; 455/101

(58) Field of Classification Search ............. 340/573.1, 340/522, 553, 554, 561, 567, 10.4, 10.5, 340/505, 935, 941, 518, 686.6; 342/20, 27, 342/28, 405; 455/101, 120–125, 154, 160.1, 455/164.2

See application file for complete search history.

(56) References Cited

U.S. PATENT DOCUMENTS

| | | | | |
|---|---|---|---|---|
| 3,803,539 A | * | 4/1974 | McMaster | ................. 367/94 |
| 3,863,240 A | * | 1/1975 | Galvin | ................. 340/529 |
| 4,107,684 A | * | 8/1978 | Watson, Jr. | ................. 342/86 |
| RE30,288 E | * | 5/1980 | Hackett | ................. 342/28 |
| 4,346,373 A | | 8/1982 | Hassman | |
| 5,247,281 A | * | 9/1993 | Facon et al. | ................. 340/562 |
| 5,521,600 A | * | 5/1996 | McEwan | ................. 342/27 |
| 5,684,458 A | * | 11/1997 | Calvarese | ................. 340/554 |
| 5,760,687 A | * | 6/1998 | Cousy | ................. 340/554 |
| 6,271,754 B1 | | 8/2001 | Durtler | |
| 6,333,691 B1 | * | 12/2001 | Janus | ................. 340/552 |
| 6,429,774 B1 | * | 8/2002 | Schmid et al. | ................. 340/506 |
| 6,624,752 B1 | * | 9/2003 | Klitsgaard et al. | ........ 340/572.1 |

FOREIGN PATENT DOCUMENTS

FR    2130004 A    11/1972

\* cited by examiner

*Primary Examiner*—Jeffery Hofsass
*Assistant Examiner*—Hoi C. Lau
(74) *Attorney, Agent, or Firm*—Maine & Asmus

(57) ABSTRACT

Detection of the presence of an animal body, for instance a human, in a detection zone is achieved by generating a low power LF field (17) between antennae (12, 18), and by measuring the disturbance of this field by the body. An analyser (16) is used detect such disturbance by measuring changes in the phase of the received signal (19).

7 Claims, 2 Drawing Sheets

DETECTION OF BODIES

FIELD OF THE INVENTION

This invention relates to the detection of animal bodies such as the body of an intruder. The invention provides both a method of and apparatus for detecting the presence of an animal in a detection zone.

BACKGROUND TO THE INVENTION

Various systems are well-known for the detection of intruders, for instance movement sensors and both passive and active infra red detectors. It is also well-known to detect the presence of a conductive, inanimate, object by its influence on a magnetic field, for instance the position of a movable magnet relative to a reed switch. It is an object of the present invention to provide an improved method and apparatus for detecting the presence of an intruder, or the like, in a detection zone.

SUMMARY OF THE INVENTION

According to one aspect of the invention, a method of detecting an animal body, comprising generating a low frequency radio (LF) detection field and detecting a phase change in the field caused by the presence of the body in the detection field.

Throughout this specification the term "low frequency" ("LF") has the internationally-accepted meaning of 30 kHz to 300 kHz. In practice, the frequency will be selected to take account both of local regulatory conditions and of the ambient conditions appropriate for detection of an intrusive object; thus the frequency or frequencies are chosen so as not to interfere with local transmission frequencies and to ensure that the intrusive object will alter the detection field. References in the specification to "animal" include both living and dead bodies, and the invention is not limited to the detection of mammalian species.

The method preferably includes using a transmit antenna to generate the field and using a receive antenna to detect any change in the detection field.

Preferably, a method according to the invention for detecting the approach of a body towards a protected area or protected opening to an enclosure, includes using a transmit antenna close to the protected area or opening and a receive antenna spaced horizontally from the transmit antenna away from the protected area or opening, monitoring the phase and amplitude of the signal received at the receive antenna, and generating an alarm signal only in response to a change in phase accompanied by an increase in amplitude.

Alternatively, for a higher level of discrimination, the method may include using at least one additional receive antenna, and using the output from these receive antennae to detect the direction in which the object moves through the detection field and/or the position of the body within the detection field.

The method preferably includes detecting the change in the detection field by measuring the phase of the signal received at a receive antenna in the absence of any animal in the detection field, and by monitoring the received signal to determine when the phase of the signal has changed by more than a predetermined amount.

The method may include generating the field at a predetermined frequency and detecting the entry of an object into the detection field by measuring any change in the phase of the LF signal received by the receive antenna.

The method preferably includes taking a reference signal from a transmission signal to the transmit antenna, and equalising this reference signal with a received signal from the receive antenna to ensure that there will be no phase shift between the transmission signal and the received signal when the detection field is free from intrusion other than that due to the distance between the antennae.

The method may include modulating the LF signal.

The method preferably includes sampling the transmitted and received LF signals in the absence of an intrusive object in the detection zone, using these samples to determine a base condition for the phase values, and comparing the received signal with this base condition. In this case the method preferably includes determination of the base conditions at two or more frequencies, generating the detection field at one frequency until the possible presence of a body is detected with reference to the base condition at that frequency, and then changing the LF frequency to confirm such intrusion with reference to the base condition at the second frequency.

The method preferably includes performing a frequency scan of the frequency spectrum to be used to determine the background noise environment, selecting the frequencies which exhibit least noise characteristics among the frequencies scanned, storing these selected frequencies in a memory for future use, and generating the detection field on one of the selected frequencies having a previously detected relatively low noise characteristic. The method may include, on detection of a possible body, changing the generation of the detection field to another of the selected frequencies separated significantly from the previously frequency, detecting any change in the phase at the receive antenna, and generating an alarm signal if such change is detected.

According to another aspect of the invention a sensor for detecting the presence of an animal body comprises a waveform generator connected to a transmit antenna to create a low frequency electromagnetic detection field, a receive antenna spaced from the transmit antenna to measure the detection field, and analyser means to detect changes in the phase caused by the presence of the body in the detection field.

In installations of the sensor which serve to protect an area, or an opening to an area, against the intrusion of a body, human or animal, it may be desirable to distinguish between bodies approaching the protection field from inside the area and those approaching outside the area, so that, for example, false alarms are not triggered by the movement of people or animals within the protected area. If the antennae are installed with a horizontal distance between them, with the transmit antenna closer to the protected area or opening, then the sensor may be arranged to determine from which side the body approaches the detection field. It has been found that, from the receive side (i.e. closer to the outside), the sensor detects an increase in phase change accompanied by an increase in signal amplitude. From the transmit side (i.e. closer to the inside), the sensor detects zero or very small increases in phase change, accompanied by a reduction in signal amplitude.

Thus, the invention preferably provides a sensor according to the invention for detecting the approach of a body towards a protected area or protected opening to an enclosure, comprising a transmit antenna close to the protected area or opening and a receive antenna spaced horizontally from the transmit antenna away from the protected area or opening, and wherein the analyser means is arranged to monitor the phase and amplitude of the signal received at the receive antenna, and to generate an alarm signal only in response to a simultaneous increase in amplitude with change in phase.

In an alternative arrangement, permitting more sophisticated discrimination, the sensor may include at least one additional receive antenna, and the analyser is arranged to process signals received by the receive antennae to detect the direction in which the body moves through the detection field and/or the position of the body within the detection field. By using a plurality of additional receive antennae located at different positions, it might be possible, for example, to track movement of the body more accurately as it approaches to the protected area or opening.

The analyser may be connected to receive a reference signal from the waveform generator and a received signal from the receive antenna, and the analyser is arranged to equalise the reference signal with the received signal to set a base condition of the phase of the signals when there is no intrusion of the detection field. In this manner the base condition can be used as a datum against which variations in the phase can be detected.

The sensor preferably includes a controller arranged to control the waveform generator to perform a frequency scan of the frequency spectrum to be used, the analyser is arranged to determine the background noise for each scanned frequency and to transmit a signal to the controller commensurate with the background noise associated with each scanned frequency, and the controller is arranged to identify those scanned frequencies having the least background noise and to store this information in a memory for future use. The controller is preferably arranged to cause the waveform generator to transmit at a frequency having low background noise. The analyser is preferably arranged to transmit a detection signal to the controller as soon as a potential intrusion is detected, the controller is arranged on receipt of a detection signal to cause the waveform generator to transmit at a different frequency noted in the memory as having low background noise, and the controller is then arranged to generate an alarm signal on receipt of a further detection signal from the analyser.

The transmit and receive antennae are preferably positioned to define a detection zone.

The invention can be used in situations in which the reliable detection of animals is required and, as it does not rely on movement, offers advantages over current designs. Variants that can be used in the following applications and others are envisaged;
 a) Intruder detection
 b) Perimeter security
 c) Access control
 d) Energy management
 e) Machine safety
 f) Marine security
 g) Automotive security
 h) Rescue
 i) Safety Further features of this invention will be apparent from the following description.

BRIEF DESCRIPTION OF THE DRAWINGS

The invention is now described, by way of example only, with reference to the accompanying drawings in which.

DETAILED DESCRIPTION OF THE ILLUSTRATED EMBODIMENT

Figure 1:
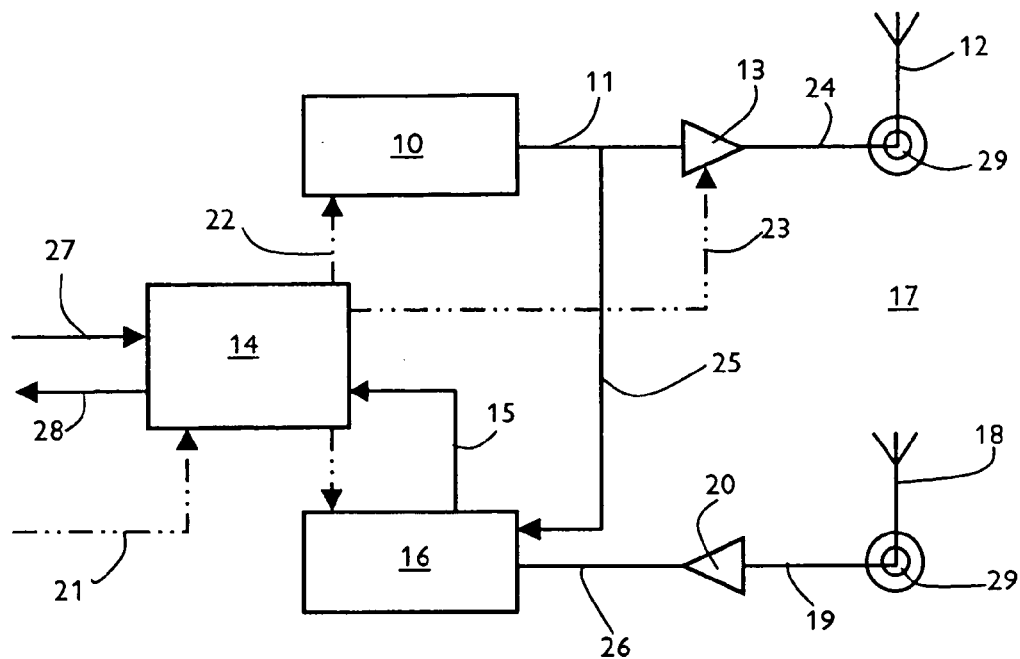
FIG. 1 is a block diagram of a sensor illustrating its function, with continuous lines showing data transmission and chain-dotted lines showing transmission of control signals.

With reference to FIG. 1, a sensor comprises a flexible waveform generator 10 arranged to produce an analogue LF signal and to transmit this LF signal 11 to a transmit antenna 12 through a transmit amplifier 13, the waveform generator 10 being controlled by a controller 14 which receives control signals 15 from an analyser 16. An LF field 17 is generated between the transmit antenna 12 and a receive antenna 18 which transmits the received signal 19 to the analyser 16 via a receive amplifier 20.

The basic principle of operation of the sensor is the modification of the LF field 17 by the intrusion of a body. A human or animal body exhibits values of both conductance and capacitance when intruding into this LF field, through the parameters of conductivity and permittivity. Whilst the exact scientific analysis is currently uncertain, such an intrusive body appears to act as a dielectric. We have found that, at the lower end of the preferred frequency range, the intrusive body acts principally as a conductor of the LF signals, with some resistive loss, but also displays a capacitive component. Below 100 kHz the capacitive element appears to be typically less than 10% of the impedance of the body, but is higher above 100 kHz.

Although the LF field 17 extends between the transmit antenna 12 and the receive antenna 18, it also extends around the transmit antenna 12. In security applications, for example, the antennae 12, 18 can be positioned vertically on the opposite sides of door frames, or horizontally on the upper and lower edges of window frames. In another security application, one of the antennae, preferably the transmit antenna 12, can be positioned generally horizontally along a perimeter that requires protection, with the receive antenna 18 (or antennae) positioned generally vertically within the protected perimeter. In another application the intrusion can be detected by two or more receive antennae which give information about the direction of intrusion and can also determine the position of the intrusive object within the LF field.

The LF field is established with a frequency preferably up to 200 kHz at low power and, when this field is disturbed by intrusion of a body, a measurable amplitude and phase shift is detected by the analyser 16. This shift in the amplitude and phase occurs as an intruder appears to act as a dielectric at these frequencies as indicated above. A set up signal 21 causes the controller 14 to apply a control signal 22 to set the frequency range of the waveform generator 10 to comply with frequency regulatory issues in the vicinity of the sensor, and can also be used to omit any frequencies that may be unsuitable for the ambient conditions. The controller 14 also uses the control signal 22 to set the appropriate channel parameters of the waveform generator 10, including frequency, amplitude and modulation. The controller 14 transmits a further control signal 23 to set the gain of the amplifier 13 so that the LF signal 11 is amplified to provide a transmission signal along a screened transmission cable 24 to ensure balanced radiation by the transmit antenna 12. The LF signal 11 is referred by data line 25 to the analyser 16 and this signal is compared by the analyser 16 with the received signal 26. The analyser 16 then causes the controller 14 to vary the gain of the transmit amplifier 13 to equalise the signal levels of the reference in data line 25 and the received signal 26. Under stable conditions there should be no phase shift between the reference signal 25 and the received signal 26 other than the constant phase difference due to the path length between the antennae 12 and 18. The receive amplifier 20 is set to balance the gain of the received signal 26 with the reference signal 25 so that the analyser 16 can detect shifts in amplitude and/or phase.

The controller 14 receives power via cable 27 and issues alarm signals along data line 28 which may communicate through a communications interface (not shown) to operate alarms, such as lights, bells or klaxons, or to alert security personnel or police, or to operate an access control system, or to operate an energy management system.

The antennae 12, 18 may be either dipole or monopole and are preferably provided with a respective tamper loop 29 operative to detect any tampering with the antennae.

During the set-up routine of the sensor, and without the presence of any intruder in the LF field 17, the controller 14 performs a frequency scan of the nominal 30 kHz to 300 kHz (preferably up to 200 kHz) spectrum to determine the background noise environment and to select those channels that exhibit least noise characteristics. These selected channels are stored in a memory (not shown) within the controller 14 in priority order as the preferred channels. In operation the sensor continuously monitors all of the preferred channels as a background task and, provided the LF environment remains stable, transmits on only one of the preferred channels. When the LF field 17 is disturbed by the intrusion of a body, there will be a phase and/or amplitude shift in the received signal 26 compared with the transmitted signal 11. To ensure that the initial detection of a phase and/or amplitude shift represents the detection of an intruder, rather than noise, the controller 14 is arranged to react by selecting another preferred channel from the memory (preferably a channel as widely separated from the initial channel as possible) and again measure any phase and/or amplitude shift. Should this second detection also prove positive, the controller 14 is arranged to report an alarm via the alarm data line 28.

Figure 2:
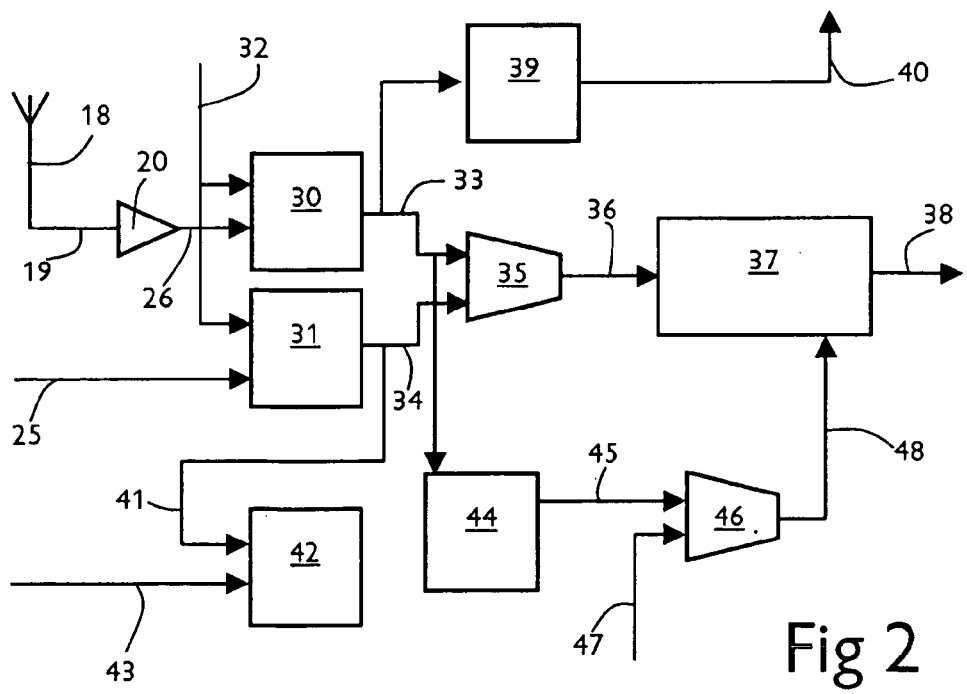
FIG. 2 is a block diagram of the analyser.

FIG. 2 illustrates the arrangement of the analyser 16 to achieve reliable detection of intrusion in the LF field 17. FIG. 2 utilises the same reference numerals as used in FIG. 1 to denote common features.

The received signal 19 is fed through the receive amplifier 20 to reduce the impedance mismatch and to provide a higher level output. A pair of high speed analogue to digital converters 30 and 31 are powered from the controller (not shown) through line 32. The reference signal 25 and the received signal 26 are converted at high speed to respective digital signals 33 and 34 by the respective analogue to digital converters 30 and 31. These digital signals 33 and 34 are fed to a dual input phase comparator 35 which generates a signal 36 commensurate to any phase shift. A logic filter 37 sets an appropriate threshold to the signal 36 and only generates an output signal 38 if this threshold is exceeded. The threshold of the logic filter 37 is set by calling up the phase shift measured at set-up which is due to the path length between the antennae 12, 18. When this threshold is exceeded, the signal 36 informs the controller 14 which stores the receive signal in its memory.

The controller is arranged at this juncture to initiate a check for broadband noise by sampling the receive signal in a multi-element band filter 39 connected to the digital output 33 representing the received signal 19. A signal output 40 from the band filter 39 leads to the controller but is implemented in software to allow the controller rapidly to determine the presence of significant high noise levels in adjacent channels. Provided that there is no broadband noise present, the controller next checks for narrow band noise. The reference signal represented by the digital signal 34 is now re-sampled along line 41 by a gating circuit 42 operated by the controller by signals along line 43. The gating circuit 42 periodically disables the transmit signal to allow detection of any unwanted transmission at the currently selected receive frequency. The digital signal 33 representing the received signal 19 is now sampled by a noise detector 44—under conditions of no transmit signal, the received signal 19 should only contain extraneous back ground noise.

The output signal 45 from the noise detector 44 is fed to a dual input subtractor 46 where its amplitude is subtracted from the amplitude of the initial detection signal that was stored by the controller and is passed to the subtractor 46 along line 47. The output from the subtractor 46 is passed along a line 48 to for thresholding. When the initial detection signal is significantly higher than the background noise level, the controller is informed by a signal along line 38.

Having detected both phase and amplitude shifts, the controller now switches to a new preferred channel of which the frequency is optimally as far away as possible from the original channel. The entire process is then repeated in order to validate, or invalidate, the presence of an intruding body, thereby improving the robustness of detection by the sensor. A second positive detection of phase and amplitude shift in the new channel is taken as confirmation of an intruder in the LF field and the controller will, as already described with reference to FIG. 1, send an alarm signal down the alarm data line 28.

Should broadband noise be detected, for instance generated by lightning or by deliberate jamming, then the analyser 16 does not declare detection of an intruder but the controller 14 enters a routine to attempt to find a "clean" channel. The presence of lightning is likely to be transient, but should jamming be employed in an attempt to fool the sensor, the controller 14 will pass an alarm alert signal down the alarm data line 28. However, should narrow band noise be detected, the controller 14 will merely switch to a new channel and continue to operate normally.

The key to sensor operation and performance is the generation of the LF field and detecting the effects of its disturbance by the intrusion of a body.

Experiments have been carried out which practically demonstrate proof of the LF field generation and the detection of intrusion into the field by a person.

Computer modelling has also been carried out using specialist programs to plot the field patterns of various antenna arrangements and to simulate the effects of field disturbance.

Both the experimental and the modelling approaches have confirmed the robustness of the technology and confirm its suitability for use as a practical sensor system.

EXAMPLES

Figure 3:
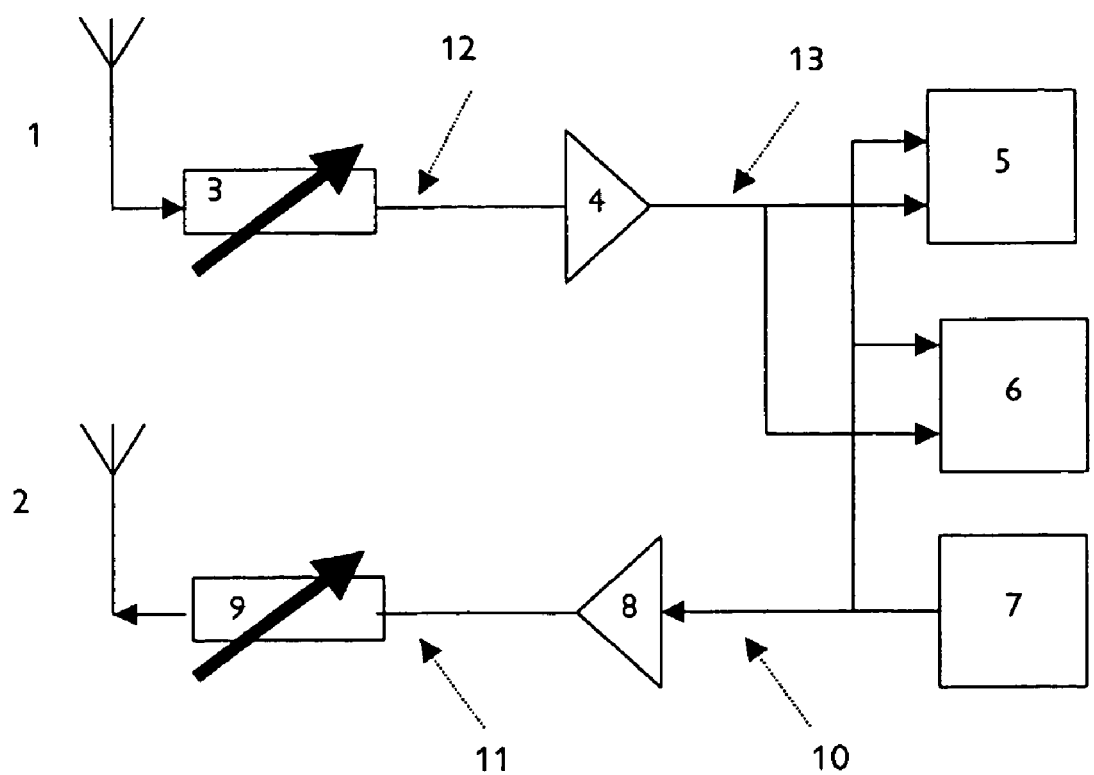
FIG. 3 is a block diagram of prototype equipment used to conduct experiments, details of which are set out hereinafter in the Examples.

Prototype equipment has been used for various performance proving tests. The prototype equipment used for the experiments was configured as shown in FIG. 3. A low power continuous wave RF signal at a nominal frequency of 100 kHz is generated in a Function Generator 7. The device used was the Velleman PCG-10 which is PC controlled (not shown). The signal is passed along signal line 10, firstly to an Amplifier 8 and secondly to provide input to a monitor Oscilloscope 6 and Timer/Counter 5. The Amplifier 8 output is passed by signal line 11 to a Matching Circuit 9. The Matching Circuit is a series of inductors which can be switched to provide an optimised match between the Amplifier and Transmit Antenna 2 dependant on the length of the Transmit Antenna.

The receive signal is passed from the Receive Antenna 1 to a Matching Circuit 3 which performs a similar function to the one used in the transmit channel. The signal is then passed via signal line 12 to a Pre-Amplifier 4 and then via signal line 13 to the monitor Oscilloscope 6 and Timer/Counter 5.

On initial set up, the transmit signal level is selected at the Function Generator 6. To optimise the match and therefore the transfer efficiency of the signal, the output of the Matching Circuit 9 is monitored on the Oscilloscope 6 whilst the Matching Circuit 9 is switched between a series of inductive loads. When a peak level is obtained, the match is deemed to be satisfactory. The same process is used to optimise the match in the receive channel, except that here the monitor point is at the output of the Pre-Amplifier 4. The Oscilloscope 6 and Timer/Counter 5 are then used to display the condition of the RF field by monitoring the sample transmit signal and the receive signal, with the Oscilloscope 6 being used to demonstrate the amplitude and phase relationship between the transmit and received signals. Dependant upon the size of phase angle change, the effect can be seen by visual comparison between the two sine waves. For better resolution the Timer/Counter 5 can be set to display the time differences between the leading edge of the transmit signal and receive signal, allowing phase angle changes to be more readily determined.

The set-up is completed in conditions of no animal presence in the field, and when the field is disturbed by an animal or animals the changes in phase angle and amplitude can be determined.

The experiments listed below are examples to illustrate the capability of the detection sensor in a wide range of potential applications for which the ability to detect animal presence reliably is a requirement. These results are typical of the prototype; improvements are anticipated from continuing developments in-hand or planned.

a) Intruder Detection—Window Opening

| | |
|---|---|
| Antenna length (Rx & Tx) | 1.5 m |
| Antenna location (Rx) | Beneath cill |
| Antenna location (Tx) | On floor |
| Frequency | 100 kHz |
| Minimum phase change | 0.2 degrees |
| Maximum phase change | 120 degrees |
| Detection range | 2.5 m |

Note: This configuration enables direction of approach to be determined by comparing phase change with amplitude change. From outside the property the phase change caused by a disturbance in the field spans the minimum to maximum and is accompanied by an increase in amplitude, from inside the property the phase change is much less and accompanied by a reduction in amplitude.

b) Intruder Detection—Door Opening

| | |
|---|---|
| Antenna length (Rx & Tx) | 1.5 m |
| Antenna location (Rx) | On floor |
| Antenna location (Tx) | On floor |
| Frequency | 100 kHz |
| Minimum phase change | 0.5 degrees |
| Maximum phase change | 60 degrees |
| Detection range | 1.5 m |

Note: This configuration enables direction of approach to be determined by comparing phase change with amplitude change. From outside the property the phase change caused by a disturbance in the field spans the minimum to maximum and is accompanied by an increase in amplitude, from inside the property the phase change is much less and accompanied by a reduction in amplitude.

c) Perimeter Protection

| | |
|---|---|
| Antenna length (Rx) | 60 m |
| Antenna length (Tx) | 1 m |
| Antenna location (Rx) | 1 m above ground |
| Antenna location (Tx) | Close coupled |
| Frequency | 100 kHz |
| Minimum phase change | 0.5 degrees |
| Maximum phase change | 45 degrees |
| Detection range | 2 m |

Note: In this configuration the Tx antenna is closely-coupled to the Rx by winding it around the feed.

d) Energy Management (Detecting the Presence of a Person Within a Room and Switching Off Light/Heat when None Detected)

| | |
|---|---|
| Antenna length (Rx) | 10 m (coiled) |
| Antenna length (Tx) | 20 m |
| Antenna location (Rx) | On ceiling |
| Antenna location (Tx) | On floor |
| Frequency | 100 kHz |
| Minimum phase change | 0.5 degrees |
| Maximum phase change | 90 degrees |
| Detection range | See note |

Note: In this configuration the Tx antenna is looped under a floor covering with the Rx antenna as a coil in the ceiling, of 100–150 mm diameter. Detection of animals within a room is possible. The experiment was conducted in a 5 m×5 m room, with 2.5 m ceiling height.

The invention claimed is:

1. A method of detecting an animal body in a low frequency radio (LF) detection field by detecting a change in the field caused by the presence of the body in the detection field, comprising scanning frequencies within an available frequency spectrum to identify those frequencies that exhibit least noise characteristics, storing said identified frequencies for future use, generating said detection field on at least one of said identified frequencies until a change in background noise is detected, and then generating said detection field on at least another one of said identified frequencies.

2. A method, according to claim 1 comprising using outputs from at least two receive antennae to detect a parameter of said body chosen from the group comprising the direction in which said body moves through said detection field, and the position of said body within said detection field.

3. A method, according to claim 1, comprising detecting changes in said detection field by monitoring the phase of a signal received by at least one receive antenna.

4. A method, according to claim 3, comprising detecting changes in said detection field by additionally monitoring the amplitude of a signal received by at least one receive antenna, and generating an alarm signal only in response to changes in both phase and amplitude.

5. A method, according to claim 1, comprising detecting changes in said detection field by comparing the phase of a signal received by at least one receive antenna with the phase previously measured in the absence of any animal body in the detection field.

6. A method, according to claim 1, comprising using a modulated LF signal to generate said detection field.

7. An animal body sensor comprising means arranged to create a low frequency (LF) electromagnetic detection field, a field detector to detect a change in said detection field caused by the presence of an animal body in said detection field, a frequency scanner to perform a frequency scan of an available frequency spectrum, said field detector being arranged to select those scanned frequencies having low background noise and to store this information in a memory for use in creating the detection field, said frequency scanner comprising a controller arranged to control a waveform generator to perform said frequency scan, said field detector arranged to transmit a detection signal to said controller as soon as any increase in background noise is detected, said controller arranged on receipt of said detection signal to cause said waveform generator to transmit at a different frequency noted in the memory as having low background noise and said controller then arranged to generate an alarm signal on receipt of a further detection signal from said field detector.

* * * * *